United States Patent [19]
Gunn et al.

[11] Patent Number: 5,319,386
[45] Date of Patent: Jun. 7, 1994

[54] IDEOGRAPHIC CHARACTER SELECTION METHOD AND APPARATUS

[76] Inventors: Gary J. Gunn, 549 Santa Barbara Rd., Berkeley, Calif. 94707; Richard L. Kleir, 2634 Claremont, Berkeley, Calif. 94705; Richard E. D. McClish, 1739 Addison #15, Berkeley, Calif. 94703

[21] Appl. No.: 924,623
[22] Filed: Aug. 4, 1992
[51] Int. Cl.$^5$ .............................................. G09G 3/02
[52] U.S. Cl. ................................. 345/173; 345/171; 400/110
[58] Field of Search ............... 340/712, 706, 711, 735, 340/751; 341/22, 23; 400/110, 109, 484; 345/173, 174, 175, 176, 177, 178, 168, 169, 171, 172, 156, 142

[56] References Cited
U.S. PATENT DOCUMENTS

| | | | |
|---|---|---|---|
| 4,484,305 | 11/1984 | Ho | 400/110 |
| 4,531,119 | 7/1985 | Nakayama et al. | 340/712 |
| 4,543,631 | 9/1985 | Kurosu et al. | 340/711 |
| 4,602,878 | 7/1986 | Merner et al. | 400/484 |
| 4,725,694 | 2/1988 | Auer et al. | 340/712 |
| 4,954,955 | 9/1990 | Chiu | 400/110 |
| 5,131,766 | 7/1992 | Wong | 400/110 |

*Primary Examiner*—Alvin E. Oberley
*Assistant Examiner*—Xiao M. Wu

[57] ABSTRACT

An interactive keyboard and display apparatus is used to enter ideographic characters in a computer or other utilisation device. The characters are defined by manually selecting displayed symbols such as phonemes, strokes, radicals and inflective tones represented in displayed key cells which are arranged in a matrix for rapid selection. Simultaneous multiple key cell selection is possible for accelerated character entry. The keyboard and display are integrated in a format suitable for replacing conventional keyboards. To avoid spurious entries, a pre-determined amount of pressure must be applied to the display panel when entering a symbol or character.

5 Claims, 4 Drawing Sheets

IDEOGRAPHIC CHARACTER SELECTION METHOD AND APPARATUS

TECHNICAL FIELD

The present invention relates to text entry systems and more specifically to a multiple-image interactive system for selecting ideographic characters and symbols.

BACKGROUND ART

It is known that alphanumeric keyboards are quite inappropriate for writing ideographic character-based written languages such as Chinese and Japanese. These ideographic languages typically use thousands of characters, each of which would typically require a separate key, thus making the resulting keyboard unduly large and extremely taxing on the user's vision and memory.

As a result, current phonetic entry systems such as Bopomofo and Pinyin have been developed whereby a desired ideographic character is displayed upon keyboard entry of phonetic elements corresponding to its pronunciation. Unfortunately in such systems, phonetic construction alone rarely produces a single ideographic character. In Chinese, for example, homonyms are very common. Such systems often require the user to select a desired character from a displayed group, following the complete entry of the corresponding phonetic symbols: a slow and laborious process.

Pen-based character entry systems allow the user to define a desired character by entering a series of 'brush' strokes. Since a complex character may not be defined until the 7th or 8th stroke, this system is also quite slow and tedious.

OBJECTS OF THE INVENTION

It is therefore a general object of the present invention to provide an interactive system for manually selecting ideographic characters of written language.

It is a more specific object of the present invention to provide an intergrated keyboard and display apparatus for performing rapid ideographic character entry without need for extensive training.

SUMMARY OF THE INVENTION

According to the invention, an interactive apparatus allowing a user to enter ideographic characters of written language into a utilisation device, such as a computer, comprises an integrated keyboard/display unit which displays a matrix of manually selectable key cells among which a user can select character-construction elements, phonetic and conceptual symbols related to a desired ideographic character to be entered. The apparatus may also display key cells pertaining to numbers and punctuation, for direct manual selection of the displayed symbol.

In the character selection process, a user selects remembered elements pertaining to a desired character to be entered. The selection of each of these remembered elements, such as phonemes, primary stroke, primary radical, etc., progressively restricts the number of eligible characters down to a single possible character. Upon final selection by the user, a character command corresponding to the single possible character is emitted by a data processor responsive to previous key cell selections.

In a preferred embodiment, the data processor displays a small cluster of possible ideographic characters for direct manual selection thereof, once the number of possible characters has been sufficiently reduced by previous symbol selection. More than one character displayed in this cluster may be selected directly for additional acceleration of the character selection process.

DETAILED DESCRIPTION OF THE PREFERRED EMBODIMENTS

Figure 1:
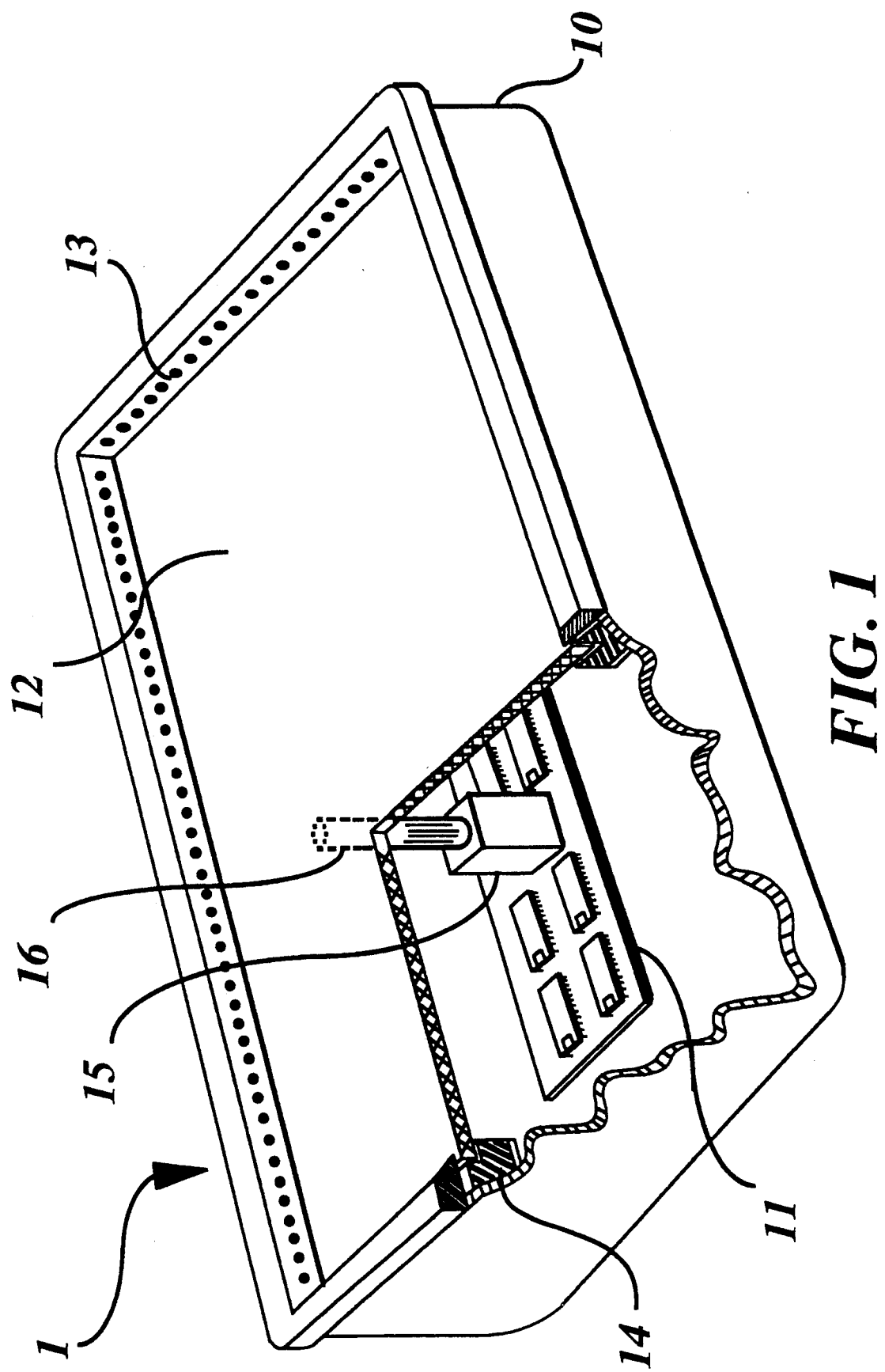
FIG. 1 is a cutaway view of an apparatus according to the present invention.

Referring now to FIG. 1, an integrated keyboard/display unit 1 comprises a data processor 11, a liquid crystal display (LCD) panel 12 and a framed infrared (IR) sensor matrix 13.

The IR sensor matrix 13 is of a conventional type, responsive to the obstruction of light beams generated therein preferably in close proximity of the top surface of the LCD display panel 12 to avoid parallax errors. The IR sensor matrix 13 is used to determine the location of a finger pointing at a displayed item to be selected.

An enclosure 10 contains the data processor 11, supports the LCD display panel 12 through a resilient suspension 14, and supports the framed IR sensor matrix 13 in a substantially fixed lateral position with respect to the LCD display panel 12, so that a fixed correspondence exists between the location of image elements displayed by the LCD display panel 12 and the location of the framed sensor matrix 13. When performing a manual selection of a displayed image element on the LCD display panel 12, the resilient suspension 14 allows the LCD display panel 12 to be depressed towards the inside of the enclosure 10 upon exerting a pressure on a portion of the displayed image.

A switch 15 mounted onto the data processor's 11 circuit board has an actuator 16 contacting the undersurface of the LCD display panel 12. The switch 15 changes state when the LCD display panel 12 is depressed by a sufficient amount, as a result of performing a manual selection of a displayed image element. The switch is electrically connected to the data processor's 11 circuitry, so that the data processor 11 can associate the depression of the LCD display panel 12 with the sensed coordinates of the interruption of a pair of light beams in the framed sensor matrix 13, thus becoming responsive to a manual selection of a displayed image element. It has been found preferable to have a detent mechanism for providing a tactile indication of manual selection of a displayed image element. This detent mechanism is incorporated in the switch 15 in the present embodiment, although it can be incorporated in the elastomeric suspension 14 or otherwise provided using known means for a similar purpose.

For ease of explanation of the present invention, the preferred embodiment will be described for use with the Chinese language, although this is not to be construed as a limitation of the present invention.

Figure 2:
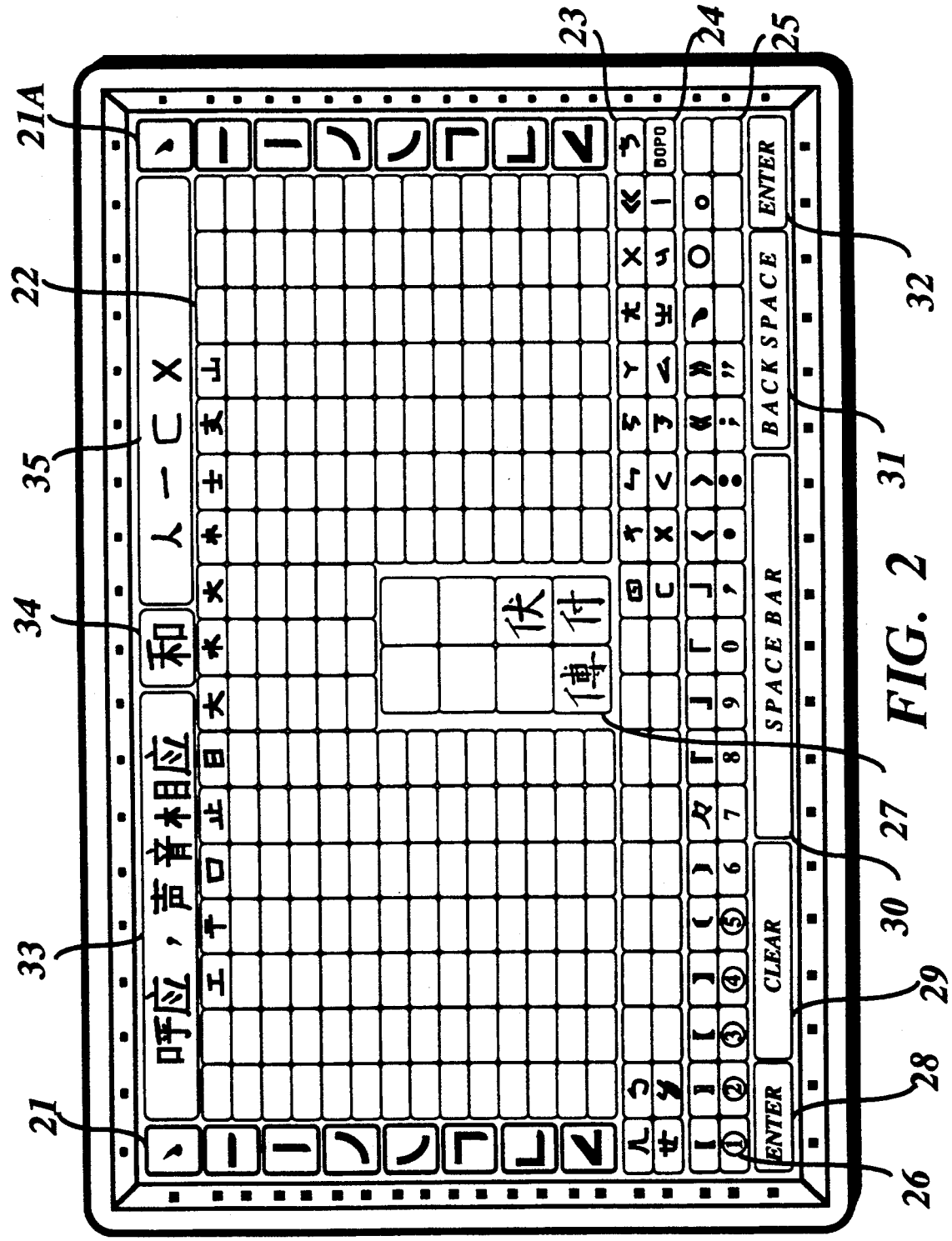
FIG. 2 is a plan view of a visible image displayed by the LCD display panel of the apparatus of FIG. 1.

Referring now to FIG. 2, pertaining to a first embodiment of the present invention, the LCD panel 12 displays an image composed of matrixed key cells which are grouped in a manner to optimize the speed of recognition and selection of a desired ideographic character among the many thousands currently in usage. Each key cell represents a manually selectable symbol. In the present description, the manual selection of a symbol or character means the manual selection of a key cell representing this symbol or character.

The key cells are categorized and grouped as follows: Strokes 21 & 21A symmetrically disposed in opposite vertical columns for rapid two-hand selection; Radicals 22 disposed in a 14×17 cell matrix between the Strokes 21 and 21A; Bopomofo/Pini-Yin key cells 23 underlying the Radicals 22 and the Strokes 21 and 21A; a Symbol Set Selection key 24 for selecting either Bopomofo or Pin-Yin symbols to be displayed in the Bopomofo/-Pini-Yin key cells 23; Punctuation and Foreign Character key cells 25; Inflective Tones 26 used to select inflections of phonetic utterances corresponding to selected Bopomofo/Pini-Yin key cells 23 during the character selection process; Target Characters 27 which appear during the character selection process; Text Entry key cells 28 and 28A, symmetrically disposed at the lower corners of the image, for transmitting 'write instruction' signals as they are normally used in the art; a Clear key 29 for erasing a symbol selection sequence; a Spacebar key 30 for entering a space between characters, as it is normally used in the art; a Backspace key 31 for deleting a character in text, as it is normally used in the art; a Last Entry window 32, displaying the last item entered in text; a Semantic Definition window 33, displaying the semantic definition of the item displayed in the Last Entry window 32, when applicable; and a Log window 34 for displaying selected symbols in the order of selection during the character selection sequence.

Figure 3:
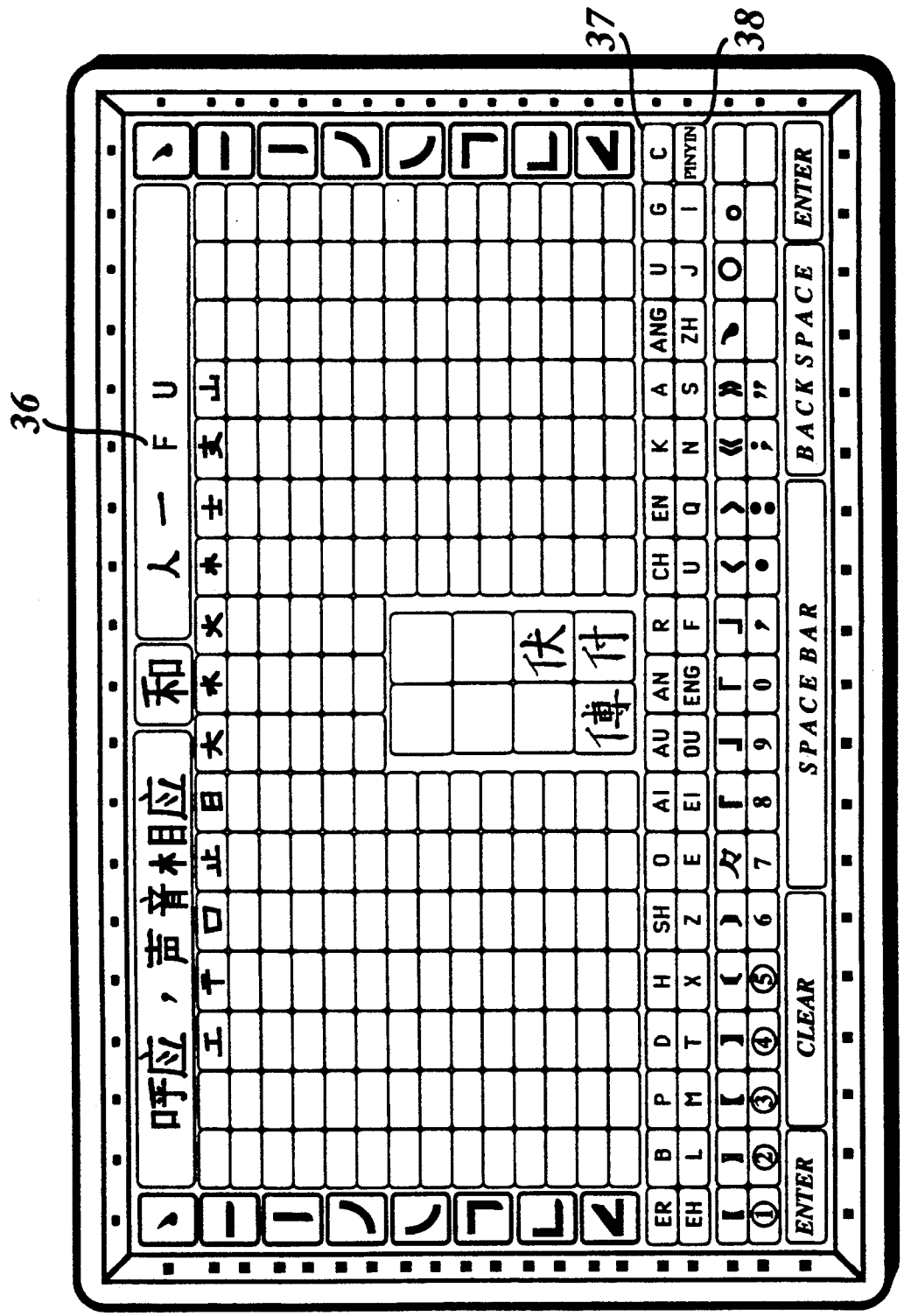
FIG. 3 shows a variation of the displayed image of FIG. 2 featuring additional key cell functions.

In FIG. 2, the Log window 34 shows a character selection sequence wherein a radical 22 was first selected, followed by a stroke 21 or 21A, and a Bopomofo phoneme symbol 23. Referring now to FIG. 3, the Log window 34 displays a similar character selection sequence wherein Pin-Yyin symbols were selected after the manual selection of a stroke 21 or 21A. An Inflective Tone 26 was then selected which defined a single Target Character 27 which may be entered in text by selecting it directly or by selecting a Text Entry key cell 28.

A user selects an ideographic character of written language by manually selecting symbols pertaining to the character. As the symbols are manually selected, the data processor 11 progressively excludes unrelated ideographic characters from a mass of stored ideographic characters typically contained in a memory file, until enough manual selections have been made to define a very limited group of Target Characters 27 for final manual selection of the desired character therein. It is also possible to continue to manually select symbols until a single character has been defined, irrespectively of displayed Target Characters 27, in order to allow the greatest convenience of use of the present invention.

It is not necessary to select from all categories of symbols to define the desired character. This is helpful because the user can use whatever is remembered about a character and enter the available information to rapidly define the character. For example, a user may select a primary radical 22 of written language and also a first phoneme 23 of spoken language, the cumulative effect of which will typically limit the number of possibly related characters to a small group of Target Characters 27 displayed for direct selection of the desired character.

Figure 4:
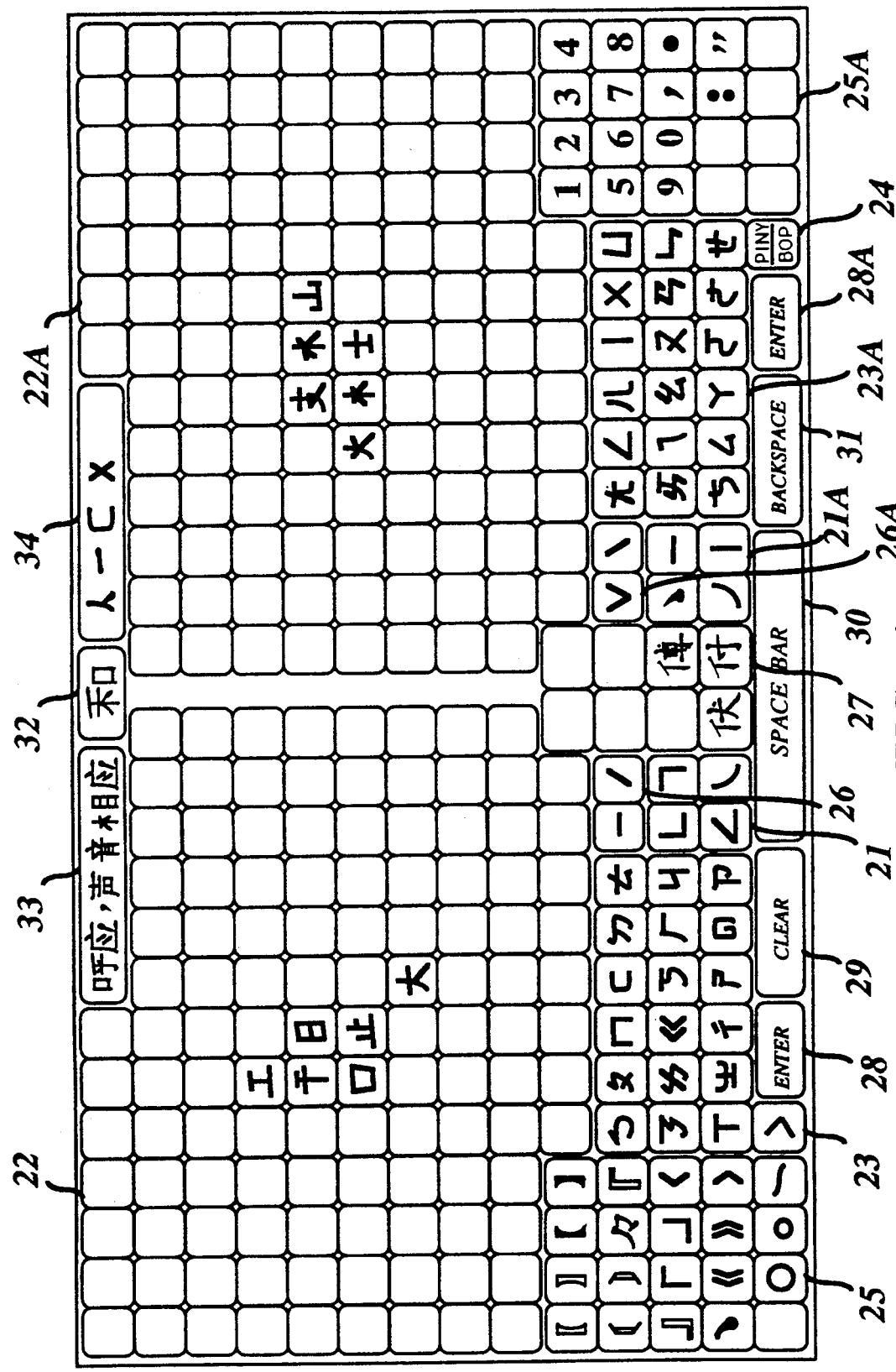
FIG. 4 is a plan view of another image displayed by the LCD display panel, showing a different key cell arrangement of the same functional groups.

Referring now to FIG. 4, an alternate disposition of the matrixed key cells is shown wherein the target characters 27, the strokes 21 & 21A and the inflective tones 26 & 26A are grouped in the center of the keyboard immediately above a central bottom row of key cells formed by the Enter keys 28 & 28A, the Clear key 29, the Spacebar key 30, the Backspace key 31 and the Pin-Yin/Bopomofo key 24. The phonemes 23 & 23A are grouped on each side of the strokes 21 & 21A and Inflective Tones 26 & 26A. The punctuation and Foreign character keys 25 & 25A occupy the lower corners of the image. The radicals 22 & 22A occupy the upper corners of the image and are disposed around a central top row of key cells formed by the Semantic Definition window 33, the Last Entry window 32 and the Log window 34.

This cluster approach to key cell grouping accelerates the selection process for users who select radicals less often than other symbols in order to define a character.

Many variations of the present invention will suggest themselves to persons of ordinary skill in the art. It is intended therefore that the foregoing description be considered as exemplary only and that the scope of the invention be ascertained by the following claims.

What is claimed is:

1. An integrated keyboard and display apparatus for selecting ideographic characters of written language, said apparatus comprising:

display means for producing an image comprising: a first group of manually selectable key cells each of which represents and displays a selectable phonetic symbol of spoken said language, for manual selection of said symbol displayed therein, a second group of manually selectable key cells each of which represents and displays a selectable symbol representative of a primary construction element of each of said ideographic characters of said written language, for manual selection of said symbol displayed therein, a third group of manually selectable key cells each of which represents and displays a selectable symbol representative of a conceptual element common to a plurality of said ideographic characters of said written language, sensing means responsive to a selection of a said selectable symbol, data processing means cooperating with said display means and responsive to a plurality of said manual selections of said selectable symbols displayed in said key cells, wherein ideographic characters unrelated to previoulsy selected said selectable symbols are eliminated from a set of candidate ideographic characters upon each said selection of a selectable said key cell, whereby said plurality of said selections of said selectable symbols ultimately defines a desired said ideographic character, and means for transmitting a signal indicative of said desired ideographic character to utillisation means.

2. The apparatus of claim 1 further comprising:

a fourth group of adjacent and manually selectable key cells pertaining to selectable said ideographic characters, for manual selection of a desired said ideographic character displayed therein.

3. The apparatus of claim 1 wherein said sensing means are responsive to an effectively simultaneous manual selection of a plurality of displayed elements of a said image, for reducing a time period required to find and select a desired ideographic character.

4. The apparatus of claim 1 wherein said data processing means further comprise means responsive to a signal indicative of an acknowledgement of reception by said utilisation means of said signal indicative of said desired ideographic character.

5. The apparatus of claim 1 wherein said sensing means are touch-sensitive, and wherein said means for transmitting said signal indicative of said desired ideographic character is actuated by further applying a pre-determined amount of pressure on a selected said key cell representative of said desired ideographic character.

* * * * *